United States Patent
Wolman et al.

(10) Patent No.: US 7,668,513 B2
(45) Date of Patent: Feb. 23, 2010

(54) PLATFORM FOR ENTERPRISE WIRELESS NETWORK MANAGEMENT APPLICATIONS

(75) Inventors: Alastair Wolman, Seattle, WA (US); Brian D. Zill, Redmond, WA (US); Jitendra D. Padhye, Redmond, WA (US); Paramvir Bahl, Sammamish, WA (US); Ranveer Chandra, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 673 days.

(21) Appl. No.: 11/474,652

(22) Filed: Jun. 26, 2006

(65) Prior Publication Data
US 2007/0298779 A1   Dec. 27, 2007

(51) Int. Cl.
*H04B 17/00* (2006.01)
(52) U.S. Cl. ............ 455/67.11; 455/432.2; 455/435.1; 455/450; 455/411; 455/426.1; 455/432; 370/338; 370/352; 370/241; 709/219; 709/223; 709/225; 702/186
(58) Field of Classification Search ............ 455/67.11, 455/453, 435.1, 450, 411, 426.1, 432, 432.2; 370/338, 352, 241; 709/219, 223; 702/186
See application file for complete search history.

(56) References Cited

U.S. PATENT DOCUMENTS

| | | | | |
|---|---|---|---|---|
| 5,901,362 A * | 5/1999 | Cheung et al. ............... | 455/525 |
| 6,957,067 B1 * | 10/2005 | Iyer et al. ................. | 455/435.1 |
| 7,154,874 B2 * | 12/2006 | Bhagwat et al. ............. | 370/338 |
| 7,286,515 B2 * | 10/2007 | Olson et al. ................. | 370/338 |
| 7,307,963 B2 * | 12/2007 | Chow et al. ................. | 370/259 |
| 7,310,664 B1 * | 12/2007 | Merchant et al. ............ | 709/220 |
| 7,333,800 B1 * | 2/2008 | Gopinath ..................... | 455/411 |
| 7,502,965 B2 * | 3/2009 | Bennett et al. ................ | 714/30 |
| 7,509,129 B2 * | 3/2009 | Sinivaara ..................... | 455/453 |
| 2006/0224730 A1 * | 10/2006 | Fok et al. .................... | 709/224 |
| 2006/0268906 A1 * | 11/2006 | Kneckt ....................... | 370/401 |

* cited by examiner

*Primary Examiner*—Marceau Milord

(57) ABSTRACT

A framework for wireless network management applications in an enterprise environment using existing general purpose computing devices is presented. At least one of the devices is configured with a wireless adapter and is used as an AirMonitor to monitor one or more wireless networks. Other devices are configured as LandMonitors to monitor traffic on a wired network in the enterprise environment. At least one inference engine uses the LandMonitors and AirMonitors by assigning them monitoring tasks. Data from the monitoring tasks are stored in a database. Analysis of the data that is computationally intensive is generally performed by the inference engines. Wireless network management applications use the framework by installing and running application-specific components (e.g., filters) on the AirMonitors, LandMonitors, and/or inference engines.

20 Claims, 4 Drawing Sheets

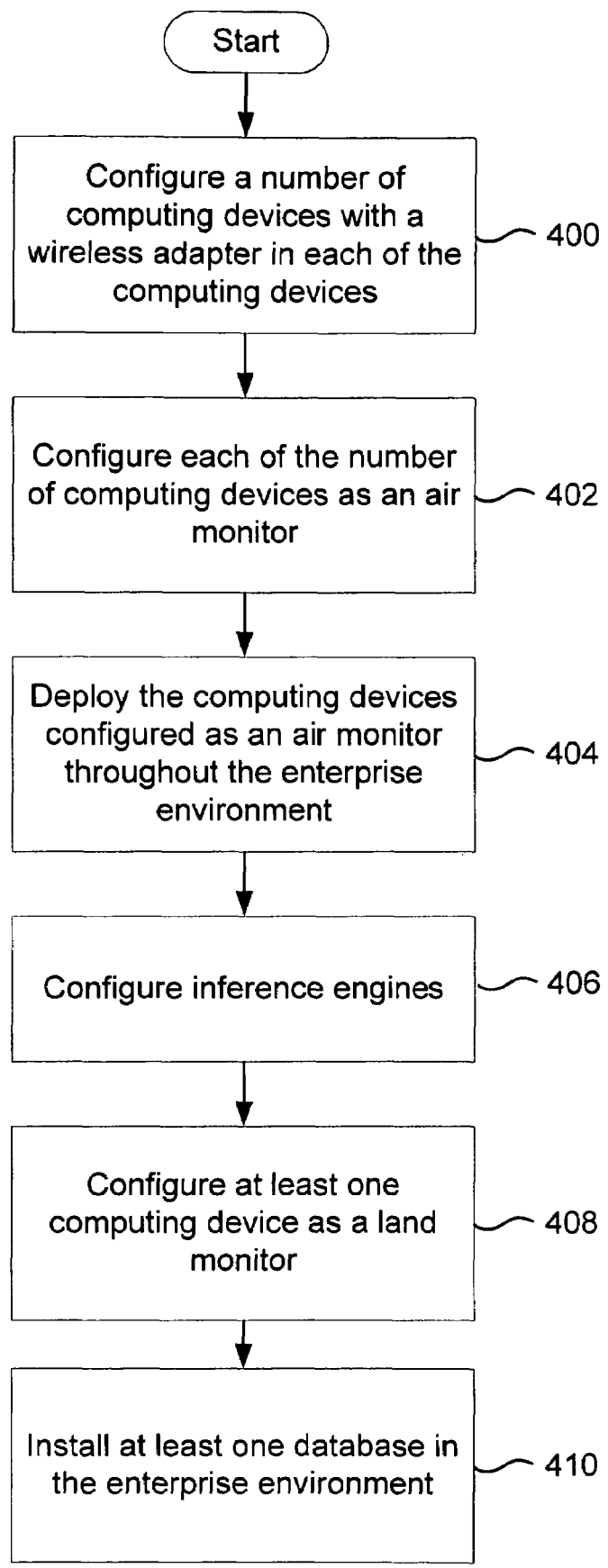

PLATFORM FOR ENTERPRISE WIRELESS NETWORK MANAGEMENT APPLICATIONS

BACKGROUND

Network diagnostics and management are becoming more prominent as the number of networks grows. Industry has primarily focused network diagnostics and management on wired networks in general, and on wide area Internet failures in particular. However, many companies are evolving towards enterprise wireless networks to become more productive. As a result, the problems associated with securing and managing wireless networks have become more prominent.

Industry has provided some commercial offerings in the area of wireless network management using two common approaches. The first common approach is to rely on Access Points (APs) for monitoring wireless networks. The second common approach is to use dedicated and often expensive custom hardware sensors for monitoring. The companies that offer products in these areas rarely discuss the mechanisms they use to detect problems. For example, there are many different levels of sophistication that one can provide when solving the security problems of rogue wireless equipment, but companies do not disclose their mechanisms used to implement their solutions.

The approach that relies on APs for monitoring wireless networks is certainly cost effective, but it has several limitations. First, an AP can not easily monitor multiple channels, or associate with other nearby APs, since the AP's primary function requires it to spend most of its time on one specific channel serving associated clients. Second, the APs usually have limited CPU power and memory resources so it is not practical to poll APs (e.g., issued SNMP (Simple Network Management Protocol) queries) too frequently. Third, the level of detail that typical commercial APs provide with their response (i.e., through their SNMP interfaces) is quite limited. Fourth, APs tend to be closed platforms so one cannot load and run third-party code on an AP, making it difficult to quickly deploy new functionality. Finally, an AP only provides a view of one end of the wireless communication, so an AP-based solution can not be used to detect problems such as RF holes or excessive interference that primarily affect the client end of the communication.

The second common approach of using dedicated hardware sensors for RF monitoring deploys special sensor nodes throughout the wireless network. Industry has also augmented the AP-based monitoring by deploying these special sensor nodes throughout the organization. However, the specialized sensors are quite expensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are, among other things, embodiments of various technologies for use in wireless network management. In accordance with one embodiment described herein, wireless adapters are installed on one or more general purpose computing devices connected to one or more wired and/or wireless networks in the environment and are configured as AirMonitors. The AirMonitors are used to monitor one or more wireless networks and are generally densely deployed throughout the enterprise such that select areas of the enterprise are monitored by the AirMonitors. Other general purpose computing devices are configured as LandMonitors that monitor traffic on the wired network(s) in the enterprise. One or more analysis engines (e.g., inference engines) are in communication with the LandMonitors and the AirMonitors.

Each application built to use the framework installs an application-specific filter that runs inside an AirMonitor service and an application-specific inferencing component that runs on one of the inference engines. The inference engines control the AirMonitors and LandMonitors by assigning them specific monitoring tasks. The data gathered by the monitors are stored in one or more databases. The data is analyzed by one or more inference engines, which also perform computationally intensive analysis tasks.

The AirMonitors have a device driver for communicating with the wireless adapter and an AirMonitor service for monitoring wireless networks. The AirMonitor service includes a driver interface in communication with the device driver, a filter processor module that receives packets from the driver interface and multicasts the packets to the running filters. The AirMonitor service also includes a command processor module that accepts commands from other components, a sender module for sending requests and receive incoming responses, and support modules. The support modules are used to ease the task of building a new filter by performing common tasks or aiding filters with tasks.

Other advantages will become more apparent from the following detailed description when taken in conjunction with the accompanying drawings.

DRAWINGS

The accompanying drawings incorporated in and forming a part of the specification illustrate several aspects of the technologies described herein, and together with the description serve to explain the principles of the technologies. In the drawings:

FIG. 4 is a flowchart illustrating the steps of implementing the technologies described herein.

While the technologies will be described in connection with certain embodiments, there is no intent to limit it to those embodiments. On the contrary, the intent is to cover all alternatives, modifications and equivalents as included within the spirit and scope of the invention as defined by the appended claims.

DETAILED DESCRIPTION

Described herein is a framework that utilizes existing general purpose desktop computing devices in an office environment and/or an enterprise environment and the like for building wireless network management applications that rely on Radio Frequency (RF) sensing. The environment shall hereinafter be called an enterprise environment, which is meant to refer to an office environment, a school environment, a home environment and the like. The framework was developed based on several observations. First, in most enterprise environments, general purpose desktop computing devices are already present. The computing devices generally are stationary and are connected to wall power and have good wired connectivity, spare CPU cycles, free disk space, and high-speed ports. Additionally, inexpensive wireless adapters (e.g., wireless cards) are readily available. By attaching wireless adapters to one or more general purpose desktop computing devices and dedicating the adapters to the task of monitoring the wireless network, a low cost wireless monitoring infrastructure is created. The advantage of this approach is that in a corporate enterprise environment, general purpose desktop computing devices are usually numerous in quantity and are usually stationary and spread throughout the enterprise environment. This provides a dense deployment of RF sensors whose locations are known and fixed. The stationary infrastructure ensures that coverage of the area being managed is adequate.

Having a fixed location for the monitors also eases the problem of location determination, which is useful for solving many wireless management problems. The fixed location of the monitors allows a wireless management system to maintain meaningful histories of the wireless network behavior seen at specific locations. Another advantage of the framework is that general purpose desktop computing devices generally have good wired connectivity. Having access to the wired network allows for a better job of monitoring and diagnosing the wireless network. A further advantage of the framework is that apart from providing spare CPU cycles and spare disk capacity, the general purpose desktop computing devices also offer access to wall power, and hence no power constraints. This permits more comprehensive monitoring of the wireless network.

Figure 1:
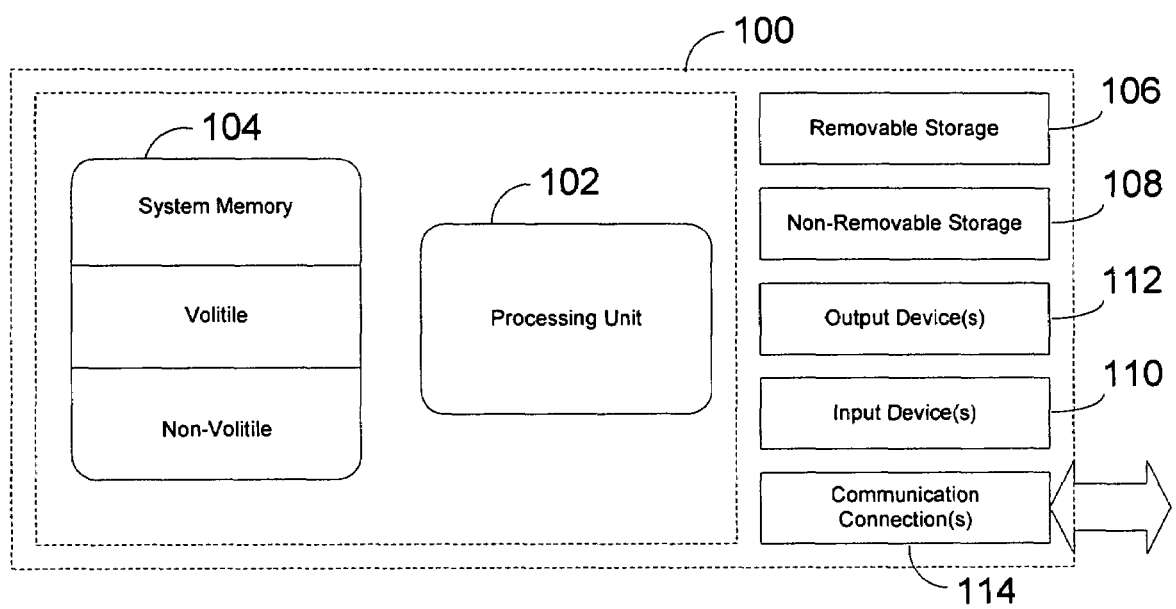
FIG. 1 is an illustration one example of a general purpose computing device that may be used in implementing the technologies described herein.

Turning to the drawings, wherein like reference numerals refer to like elements, the general purpose desktop computing device shall be described. As used herein, a general purpose desktop computing device is a computing device that is generally used in the enterprise environment. With reference to FIG. 1, a general purpose desktop computing device 100 that is commonplace in office environments and enterprise-wide environments is illustrated. In its most basic configuration, the general purpose desktop computing device 100 typically includes a processing unit 102 and memory 104. Depending on the exact configuration and type of desktop computing device, memory 104 may be volatile (such as RAM), non-volatile (such as ROM, flash memory, etc.) or some combination of the two. Additionally, device 100 may also have mass storage (removable storage 106 and/or non-removable storage 108) such as magnetic or optical disks or tape. Similarly, device 100 may also have input devices 110 such as a keyboard and pointing device, commonly referred to as a mouse, trackball or touch pad and/or output devices 112 such as a display, speakers, printer, etc. Other aspects of device 100 include wired network connections 114 to other devices, computers, networks, servers, etc. All these devices are well know in the art and need not be discussed at length here. While the above embodiment of a general purpose desktop computing device has been described, the framework described here is not limited to use of this embodiment. Other types of general purpose computing devices may be used.

Figure 2:
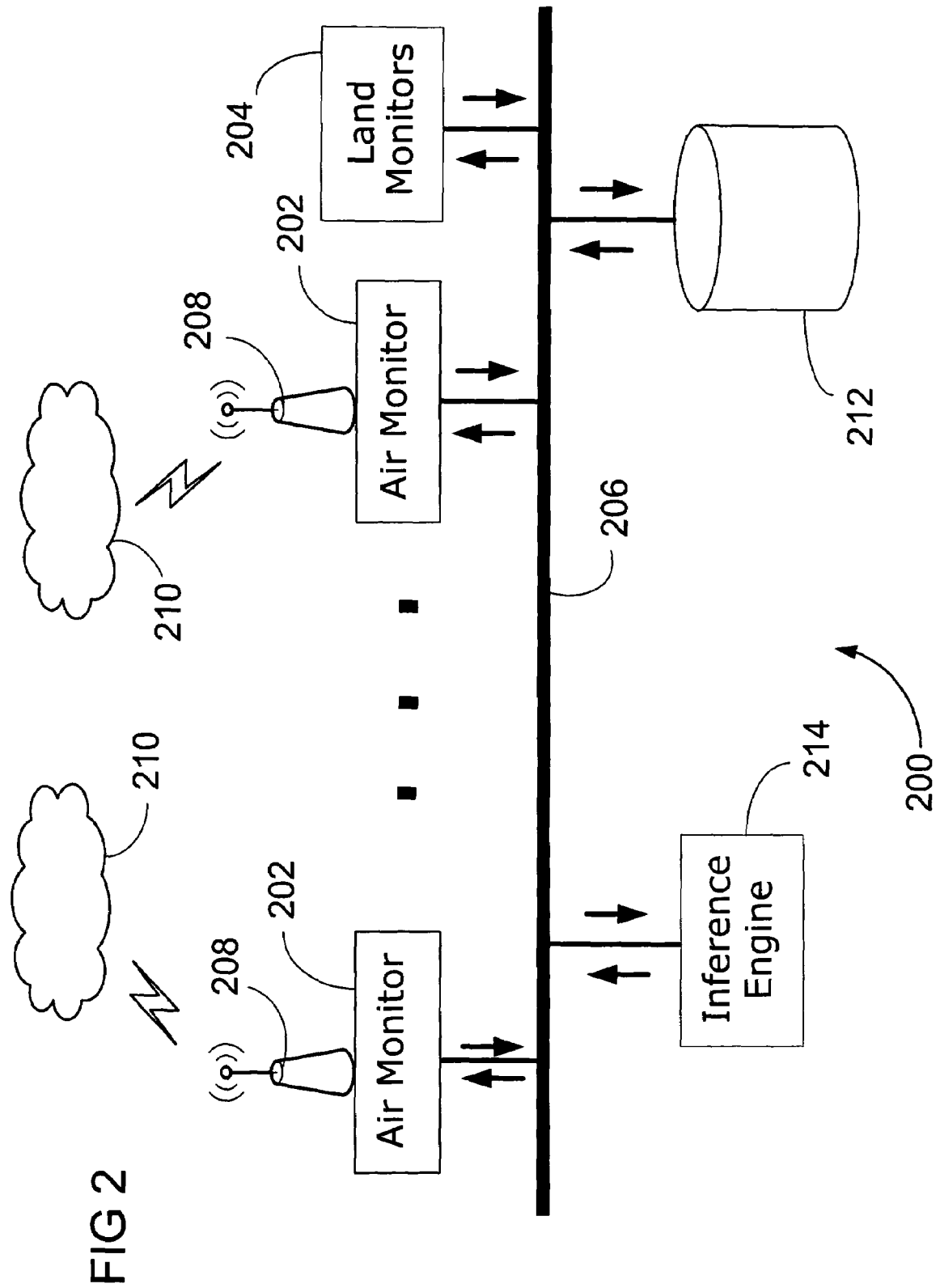
FIG. 2 is a block diagram illustrating the AirMonitors and LandMonitors of the invention in an operating environment.

Turning now to FIG. 2, an embodiment 200 of the framework utilizes two types of monitoring nodes. These monitoring nodes are AirMonitors 202 and LandMonitors 204. The AirMonitors 202 are general purpose desktop computing devices 100 assigned to users (e.g., employees) that are connected to the wired network 206 and are equipped with wireless adapters 208 that support promiscuous mode and that monitor one or more wireless networks 210. Other types of wireless adapters may be used. The AirMonitors 202 monitor wireless traffic that is "in the air." The LandMonitors 204 are general purpose desktop computing devices 100 that monitor traffic on wired networks. For example, a LandMonitor 204 may be used to monitor specific requests (e.g., DHCP (dynamic host configuration protocol) requests) on a subnet.

The data gathered by the AirMonitors 202 and LandMonitors 204 is stored in one or more databases 212. The data is analyzed by one or more inference engines 214. The inference engines control the AirMonitors 202 by assigning them specific monitoring tasks. The inference engines also perform computationally intensive analysis tasks such as, for example, detecting intrusions and denial of service attacks on the wireless network. While an inference engine may be installed on a general purpose desktop computing device, it is more practical to allocate dedicated machines to inferencing rather than running these tasks on an end-user's general purpose desktop computing device. An AirMonitor 202 may simultaneously serve requests from several different inference engines 214. The ability to perform multiple monitoring tasks at the same time on a channel ensures scalability of the framework.

Before accepting a request from an inference engine 214, the AirMonitor 202 checks to see if it can fulfill the request. For example, if an AirMonitor 202 receives a new request to monitor a specific channel different from the one it is already monitoring, it will refuse that new request, unless it has more than one wireless adapter that can be used for monitoring. Similarly, if the AirMonitor 202 determines that the additional request will place an undue burden on the AirMonitor 202, it will refuse the request. While the precise definition of what constitutes undue burden varies based on circumstances, parameters such as history of CPU and memory usage are taken into consideration. To ensure scalability, the AirMonitors 202 filter and summarize the data acquired from monitoring before reporting it to the database 212. For example, if an inference engine 214 is interested in monitoring the presence of unauthorized access points (APs) on a specific channel, it will issue a request to one or more AirMonitors 202 to switch to that channel and periodically report all the unique SSIDs (wireless network names) and BSSIDs (MAC addresses of APs) that they have heard. The inference engine 214 can then look through the data to detect unknown SSIDs or BSSIDs that may signal presence of unauthorized APs. The AirMonitors 202 are not limited to passive observations. They can also send packets. For example, an inference engine 214 may request one of the AirMonitors 202 to attempt to associate with an unknown AP in order to gather more information. This requires the AirMonitor 202 to send association requests and to process incoming responses.

Figure 3:
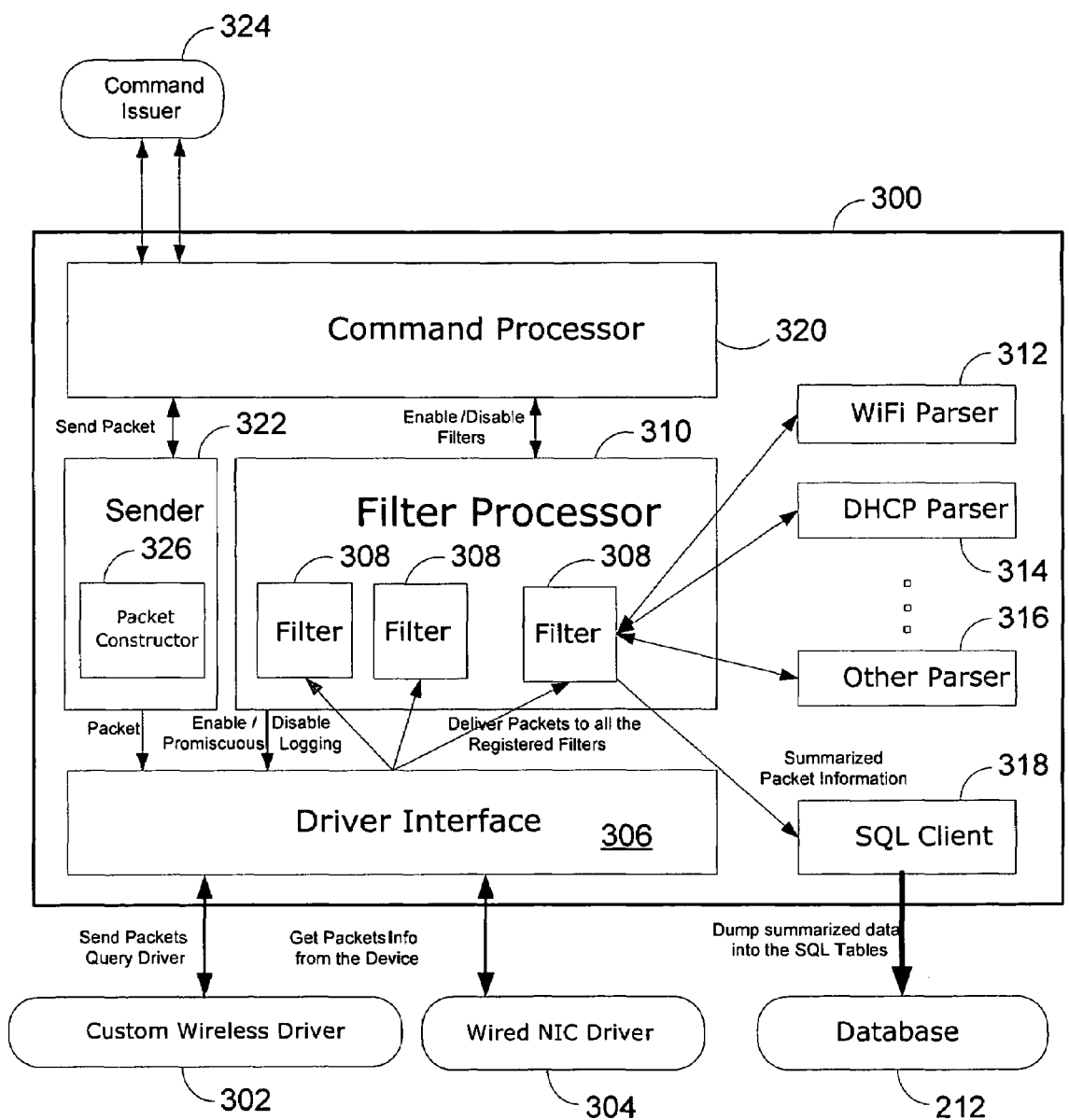
FIG. 3 is a block diagram of an AirMonitor.

Turning now to FIG. 3, shown therein is an AirMonitor 202. The principle task of an AirMonitor 202 is to listen continuously, either on a fixed channel or in scan mode on a sequence of channels. The AirMonitor 202 configures the wireless adapter in promiscuous mode, so that all 802.11 packets are received, including those destined for other 802.11 stations. The AirMonitor 202 has an AirMonitor service 300 and a wireless device driver 302 that works with the wireless adapter. The AirMonitor service 300 enables promiscuous mode, monitor mode as described below, and packet logging at the driver level, at which point all packets are delivered to the service 300. The wired network device driver 304 works with the wired network 206. The wireless device driver 302 and the wired network device driver 304 communicate with the AirMonitor service 300 via driver interface 306.

The wireless device driver 302 supports packet logging so that all received 802.11 frames are copied into a buffer. All 802.11 frames are copied into this buffer, including those that have decoding errors. Stored along with each packet is additional information about the packet reception, including the signal strength, the channel, and the data rate. The wireless device driver 302 supports user-level programs to copy the contents of the buffer, and to count how many packets are dropped if the buffer becomes full. The wireless device driver 302 supports a mode called monitor mode. Some of the functions that the wireless device driver 302 performs in monitor mode include disabling all of the driver's default scanning behavior and performing occasional scans. When the wireless device driver 302 is not associated with a wireless network, it performs occasional active and passive scans. An active scan is performed by switching to each channel, issuing a probe request, and then waiting for probe responses from any surrounding access points. Passive scans are done by listening for beacons on each channel, in turn. Monitor mode is useful for two reasons. First, when monitor mode is enabled, the AirMonitors 202 become completely passive: they do not emit any packets. Second, when a particular channel is selected, the wireless device driver 302 will not automatically switch to other channels thereby missing some packets on the channel it was tasked to monitor.

Within the AirMonitor service 300, the basic unit of extensibility is a filter 308. Each wireless network management application that uses the framework 200 installs an application-specific filter 308 that runs inside the AirMonitor service 300. The filter processor module 310 takes all packets from the driver and multicasts them to each running filter. The filter's primary task is to analyze the packets, summarize them in an application-specific manner, and then submit those summaries to the database server 212. To ease the task of building a new filter, the AirMonitor service 300 contains a number of support modules 312-318. For example, filters 308 make use of the 802.11 parser module 312 to extract information from the packets and they make use of the database module 318 to assist with the task of submitting summaries to the database 212. The intent is that filters 308 do whatever summarization is sensible to improve the scalability of the system without imposing an undue CPU or network burden on the AirMonitors 202. For example, submitting every packet that each AirMonitor 202 overhears to the database 212 is bandwidth intensive, so some processing should be done by the filters 308 running on the general purpose computing device. However, the AirMonitors 202 should not do all of the complex data analysis, which consumes host resources and is the responsibility of the inference engine 214.

The command processor module 320 accepts commands from other components 324 (e.g., a management console, an inference engine 214, etc.). Before accepting an incoming request, the command processor module 320 checks to see if it can fulfill the request. For example, if an AirMonitor 202 receives a new request to monitor a specific channel different from the one it is already monitoring, it will refuse that new request, unless it has more than one wireless adapter that can be used for monitoring. Similarly, if the AirMonitor 202 determines that the additional request will place undue burden on the host, it will refuse the request. While the precise definition of what constitutes undue burden varies based on circumstances, parameters such as history of CPU and memory usage are taken into consideration.

As previously discussed, the AirMonitors 202 are not limited to passive observations. For example, an inference engine 214 may request one of the AirMonitors 202 to attempt to associate with an Access Point in order to gather more information. This requires the AirMonitor 202 to send association requests and to process incoming responses. The AirMonitor 202 uses sender module 322 to send requests. The packet constructor 326 constructs messages such as the association requests using the appropriate protocol.

Internally, the structure of the LandMonitors 204 is similar to that of the AirMonitors 202. In other words, a LandMonitor 204 has a LandMonitor service that includes a driver interface, a filter processor module, a command processor module, support modules, a sender module, etc. The key differences between the LandMonitor 202 and the AirMonitor 202 is that the LandMonitor service is used to monitor the wired network instead of a wireless network and a LandMonitor does not require a wireless adapter (or the wireless device driver) since it is not monitoring any wireless network. It is expected that LandMonitors 204 can be deployed with much less density than AirMonitors 202 and may not be needed in some enterprise environments such as, for example, small office environments where there are a limited number of computing devices in the environment or in an enterprise environment where there is no wired network. Note that the same general purpose computing device can serve both as an AirMonitor 202 and a LandMonitor 204.

The inference engines 214 learn about new events by issuing queries to the database 212. For most applications, such queries only need to analyze data that has been submitted to the database server by the AirMonitors 202 since the last query. The computationally intensive analysis tasks are typically performed by the inference engines 214. As is the case with the filters 308 in the AirMonitor service 300, each application installs an application-specific inferencing component that runs on one of the inference engines 214. To illustrate the kind of computation done by an inference engine 214, the inference engine for detecting rogue wireless networks shall be briefly described. The inference engine 214 issues periodic queries that look at all of the new arrivals in the "SSID and BSSID seen" table located in database server 212 since the last query, and then checks whether any of those networks are not in the list of approved SSID's and BSSID's in the database server 212. If it finds an unknown network, then the inference engine 214 issues commands to the AirMonitors 202 to perform one or more tests to decide whether an unknown wireless network is connected to the wired network in question.

The database server 212 may be any type of database server, including by way of example and not limitation, Microsoft's SQL Server 2005. The framework is designed to scale to handle very large enterprises. The use of a centralized database does not limit the scale of the system because when the number of clients in the system exceeds the capacity of a single database server, one can simply deploy another database server.

Note that the number of AirMonitors 202 that can overhear packets from a particular location increases with the density of deployment. Thus, even when AirMonitors 202 are scanning the channels, one can more easily come up with a scanning assignment that can ensure that each office in an enterprise is "covered" by at least one AirMonitor 202 at all times. The LandMonitors 204 are generally not as densely deployed as AirMonitors 202 and may not be needed in some environments.

Turning now to FIG. 4, shown therein is a method to provision a framework. A selected number of the general purpose computing devices are each configured with a wireless adapter (step 400). Each of the selected number are further configured as an AirMonitor (step 402). This step includes installing an AirMonitor service for monitoring at least one wireless network in the enterprise and installing a device driver for communicating with the wireless adapter. The step of installing the AirMonitor service includes the steps of installing a driver interface, installing a filter processor module, installing a command processor module, installing at least one support module, and installing a sender module. The selected number are deployed throughout the at least one wired network such that a wireless footprint established by the selected number of the general purpose computing devices covers a selected area in the enterprise (step 404). One or more inference engines are configured to communicate with the selected number of the general purpose computing devices (step 406). At least one of the general purpose computing devices is configured as a LandMonitor service (step 408). This step includes installing a driver interface, installing a filter processor module, installing a command processor module, and installing at least one support module. At least one database is installed in the environment (step 410).

The foregoing description of various embodiments has been presented for purposes of illustration and description. Although the subject matter has been described in language specific to structural features and/or methodological acts, it is to be understood that the subject matter defined in the appended claims is not necessarily limited to the specific features or acts described above. It is not intended to be exhaustive or to limit the invention to the precise embodiments disclosed. Rather, the specific features and acts described above are disclosed as example forms of implementing the claims. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of provisioning a framework for wireless network management applications using general purpose computing devices in an enterprise having at least one wireless network comprising: provisioning a selected number of the general purpose computing devices with a wireless adapter, the selected number of the general purpose computing devices deployed throughout at least one wired network such that a wireless footprint established by the selected number of the general purpose computing devices covers a selected area in the enterprise; on the selected number of the general purpose computing devices: installing a wireless device driver for communicating with the wireless adapter; and installing an AirMonitor service for monitoring the at least one wireless network; and monitoring the at least one wired network using a LandMonitor service operably coupled with at least one of the general purpose computing devices, wherein the LandMonitor service comprises: a driver interface for communication with at least one wired network; a filter processor module in communication with the driver interface, the filter processor module receiving packets from the driver interface and multicasting the packets to at least one running filter; a command processor module in communication with the filter processor module; and at least one support module in communication with the at least one running filter.

2. The method of claim 1, comprising providing an inference engine adapted to communicate with the selected number of the general purpose computing devices.

3. The method of claim 2, comprising installing the LandMonitor service on the at least one of the general purpose computing devices.

4. The method of claim 3, installing the LandMonitor service on the at least one of the general purpose computing devices comprising:
   installing a driver interface;
   installing a filter processor module;
   installing a command processor module; and
   installing at least one support module.

5. The method of claim 3, comprising installing a database on one of the at least one wireless network and the at least one wired network.

6. The method of claim 5, the inference engine further adapted to communicate with the database.

7. The method of claim 1, installing the AirMonitor service on the selected number of the general purpose computing devices comprising:
   installing a driver interface;
   installing a filter processor module;
   installing a command processor module;
   installing at least one support module; and
   installing a sender module.

8. The method of claim 1, when installed, the device driver not automatically switching to other channels when a particular channel is selected.

9. A framework for wireless network management applications using general purpose computing devices having at least one wireless network comprising: at least one of the general purpose computing devices configured as an AirMonitor, comprising: a wireless adapter; a wireless device driver for communicating with the wireless adapter; and an AirMonitor service for monitoring the at least one wireless network, the AirMonitor service in communication with the wireless device driver, and comprising: a driver interface in communication with the wireless device driver; a filter processor module in communication with the driver interface, the filter processor module receiving packets from the driver interface and multicasting the packets to at least one running filter; a command processor module in communication with the filter processor module; at least one support module in communication with the at least one running filter; and a sender module for sending requests and receive incoming responses; the sender module in communication with the at least one running filter; and at least one inference engine in communication with the at least one of the general purpose computing devices configured as an AirMonitor.

10. The framework of claim 9, the at least one support module including an 802.11 parser module.

11. The framework of claim 10, the wireless device driver supporting: packet logging so that received 802.11 frames are copied into a buffer, user-level programs to copy the contents of the buffer; and counting how many packets are dropped if the buffer becomes full.

12. The framework of claim 9, the at least one support module including a database helper module to assist with a task of submitting summaries to a database.

13. The framework of claim 9, comprising at least one of the general purpose computing devices configured as a LandMonitor.

14. The framework of claim 13, a general purpose computing device configured as a LandMonitor comprising:
   a driver interface for communication with at least one wired network;
   a filter processor module in communication with the driver interface, the filter processor module receiving packets from the driver interface and multicasting the packets to at least one running filter;
   a command processor module in communication with the filter processor module; and at least one support module in communication with the at least one running filter.

15. The framework of claim 13, the at least one of the general purpose computing devices configured as a Land-Monitor establishing a footprint that covers a selected area of an enterprise.

16. The framework of claim 9, the at least one of the general purpose computing devices configured as an AirMonitor establishing a wireless footprint that covers a selected area of an enterprise.

17. The framework of claim 9, a plurality of the general purpose computing devices configured as AirMonitors and densely deployed throughout an enterprise such that a wireless footprint established by the plurality of the general purpose computing devices covers a selected area in the enterprise.

18. The framework of claim 9, comprising at least one database in communication with the at least one of the general purpose computing devices configured as an AirMonitor and the at least one inference engine.

19. A non-transient computer readable storage medium having computer-executable instructions, that when executed on a computing system via a microprocessor perform a method of provisioning a framework for wireless network management applications using general purpose computing devices in an enterprise having at least one wireless network, the method comprising: provisioning a selected number of the general purpose computing devices with a wireless adapter, the selected number of the general purpose computing devices deployed throughout the at least one wired network such that a wireless footprint established by the selected number of the general purpose computing devices covers a selected area in the enterprise; on the selected number of the general purpose computing devices: installing a wireless device driver for communicating with the wireless adapter; using an AirMonitor service for monitoring the at least one wireless network, where using the AirMonitor service comprises: using a driver interface to communicate with the wireless device driver; using a filter processor module in communication with the driver interface to receive packets from the driver interface and multicast the packets to at least one running filter; using a command processor module in communication with the filter processor module; using at least one support module in communication with the at least one running filter; and using a sender module to send requests and receive incoming responses, where the sender module is in communication with the at least one running filter; and providing an inference engine adapted to communicate with the selected number of the general purpose computing devices.

20. The non-transient computer readable storage medium of claim 19, the method comprising using at least one of the general purpose computing devices as a LandMonitor, where the LandMonitor comprises one or more of: a driver interface for communication with at least one wired network; a filter processor module in communication with the driver interface, the filter processor module receiving packets from the driver interface and multicasting the packets to at least one running filter; a command processor module in communication with the filter processor module; and at least one support module in communication with the at least one running filter.

* * * * *